UNITED STATES PATENT OFFICE.

NICHOLAS ALEXEIEWITCH BIBIKOV, OF ALBUQUERQUE, TERRITORY OF NEW MEXICO, ASSIGNOR OF PART TO CHARLES L. HUBBS, BERNARD S. RODEY, WILLIAM C. BURKE, CHARLES R. SHUPE, JOSEPH H. LOVELAND, AND ABRAHAM W. HARRIS, ALL OF TERRITORY OF NEW MEXICO, AND IDA STEIN AND ANNIE C. HALLORAN, OF ALBUQUERQUE, TERRITORY OF NEW MEXICO.

COMPOSITION FOR PAINT.

SPECIFICATION forming part of Letters Patent No. 421,229, dated February 11, 1890.

Application filed June 29, 1889. Serial No. 316,088. (No specimens.)

*To all whom it may concern:*

Be it known that I, NICHOLAS ALEXEIEWITCH BIBIKOV, a subject of the Emperor of Russia, but have declared my intention to become a citizen of the United States, residing at Albuquerque, in the county of Bernalillo and Territory of New Mexico, have invented certain new and useful Improvements in Composition for Paints, Roofing, Calcimine, &c.; and I do declare the following to be a full, clear, and exact description of the invention, such as will enable others skilled in the art to which it appertains to make and use the same.

This invention relates to certain new and useful improvements in compositions for paints, roofings, calcimine, and the like; and it has for its object to produce a composition of matter which, when used either alone or with all pigments or coloring-matter, particularly with iron ores carrying tungsten, manganese, and tin, also with metals of the alkaline earths and metals of the alkalies and their combinations, will be a substitute for vegetable oils, mineral oils, wood-tar, bitumen, asphaltum, glue, and rubber, which are now used in the manufacture of paints, calcimine, roofing, &c. These ingredients are all combustible, and many of them are inflammable, while the composition of matter which is embodied in my invention, being a combination of exclusively mineral substances, is practically water-proof, fire-proof, and acid-proof, and a non-conductor of heat and of electricity, and will preserve from decay wood, stones, or other material to which it may be applied.

In carrying out my invention I combine ground or pulverized mica, either muscovite, bicite, or any of the other varieties, with a solution of various proportions of potassium, silicate, and of sodium silicate in boiling water, and using this solution either cold or heated. For instance, I mix five parts, by weight, of carbonate of soda with seven parts, by weight, of carbonate of potash and eighteen parts, by weight, of silica, or ten parts, by weight, of silica and one part of charcoal, which last-named ingredient is added for the purpose of accelerating fusion. All of the ingredients are pulverized before mixing them. After mixing the ingredients I thoroughly fuse them and dissolve the fused mass in from six to eight parts, by weight, of boiling water. After having been filtered or strained and diluted or thickened to a proper consistency with lime-water I add to the solution from five to twenty-five per cent. of ground or pulverized mica. The mica forms with the said solutions, after the menstruum—that is, the surplus water—has evaporated by exposure to the air, a combination similar in its chemical composition to the varieties of feldspar known as "orthoclase," "albite" and the mineral known as "nepheline." This combination, when used alone—that is, for itself—or with any or with all pigments or coloring-matter, and particularly with iron ores carrying tungsten, manganese, and tin, also metals of alkaline earths and metals of the alkalies and their combinations for the preparation of paints, calcimine, roofing, &c., forms a practically fire-proof, water-proof, and acid-proof vehicle and covering which is a non-conductor of heat and of electricity, also preserves objects coated or saturated with it from decay.

For some particular purposes, as for paint, calcimine, roofing, cements, &c., of brick, stone, or slate, I add to the solution of silicate of potash or of silicate of soda, containing pulverized or ground mica, as stated above, from three to six per cent. (of the total weight of the liquid) of lime, either unslaked or air-slaked, or lime-water. When the lime is added, the liquid, after being exposed to the air, evaporates and forms a combination which is similar in its chemical composition to the varieties of feldspar known as "oligoclase" and "andesite," and makes practically a fire-proof and acid-proof coating or covering which is a non-conductor of heat and electricity and a preservative from decay, and an excellent filler in wood-finishing.

The addition of the pulverized mica, which is softened and partly dissolved in the fluids, furnishes to the compound silicate of potash and silicate of alumina. The addition of the unslaked lime heats up the liquid and starts a chemical reaction, the result of which is the foundation of the silicates of lime, alumina, potash, and soda, which are insoluble in cold water or water at an ordinary temperature.

I am aware that soluble glass and mica with earthy substances have been used for insulating purposes; but these have generally been baked or otherwise hardened, (as would be accomplished by the admixture of plaster-of-paris,) and in the present invention I do not contemplate such compounds, my invention or compound being adapted to be used in a liquid state, and is applied by the use of a brush.

What I claim as new is—

The herein-described paint compound, the same comprising a vehicle consisting of a solution of silicate of soda, potash, pulverized mica, and lime suspended therein, substantially as specified.

In testimony whereof I affix my signature in presence of two witnesses.

NICHOLAS ALEXEIEWITCH BIBIKOV.

Witnesses:
WM. C. BURKE,
C. R. SHUPE.